April 30, 1946.                D. A. LUTTON                2,399,236
MICROMETER
Filed Feb. 12, 1944                2 Sheets-Sheet 1
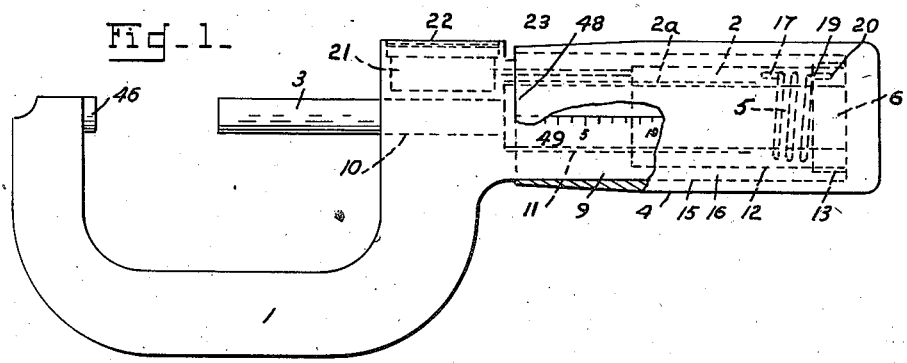
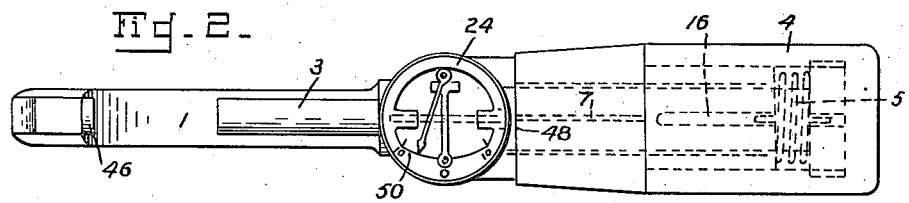
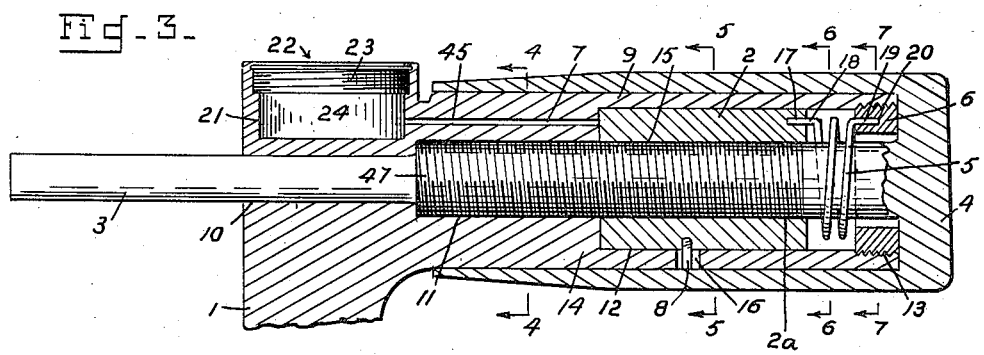
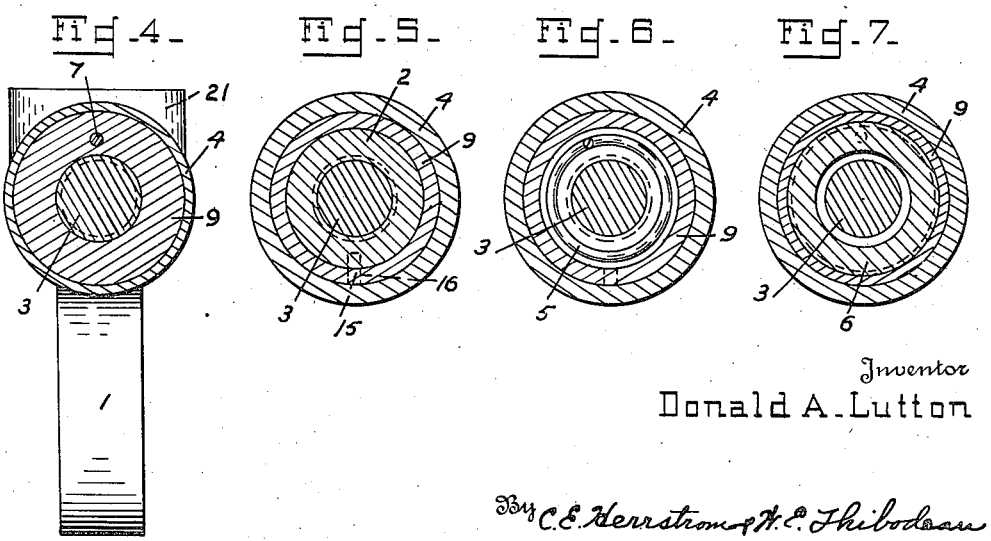
Inventor
Donald A. Lutton
By C. E. Herrstrom & H. E. Thibodeau
Attorneys

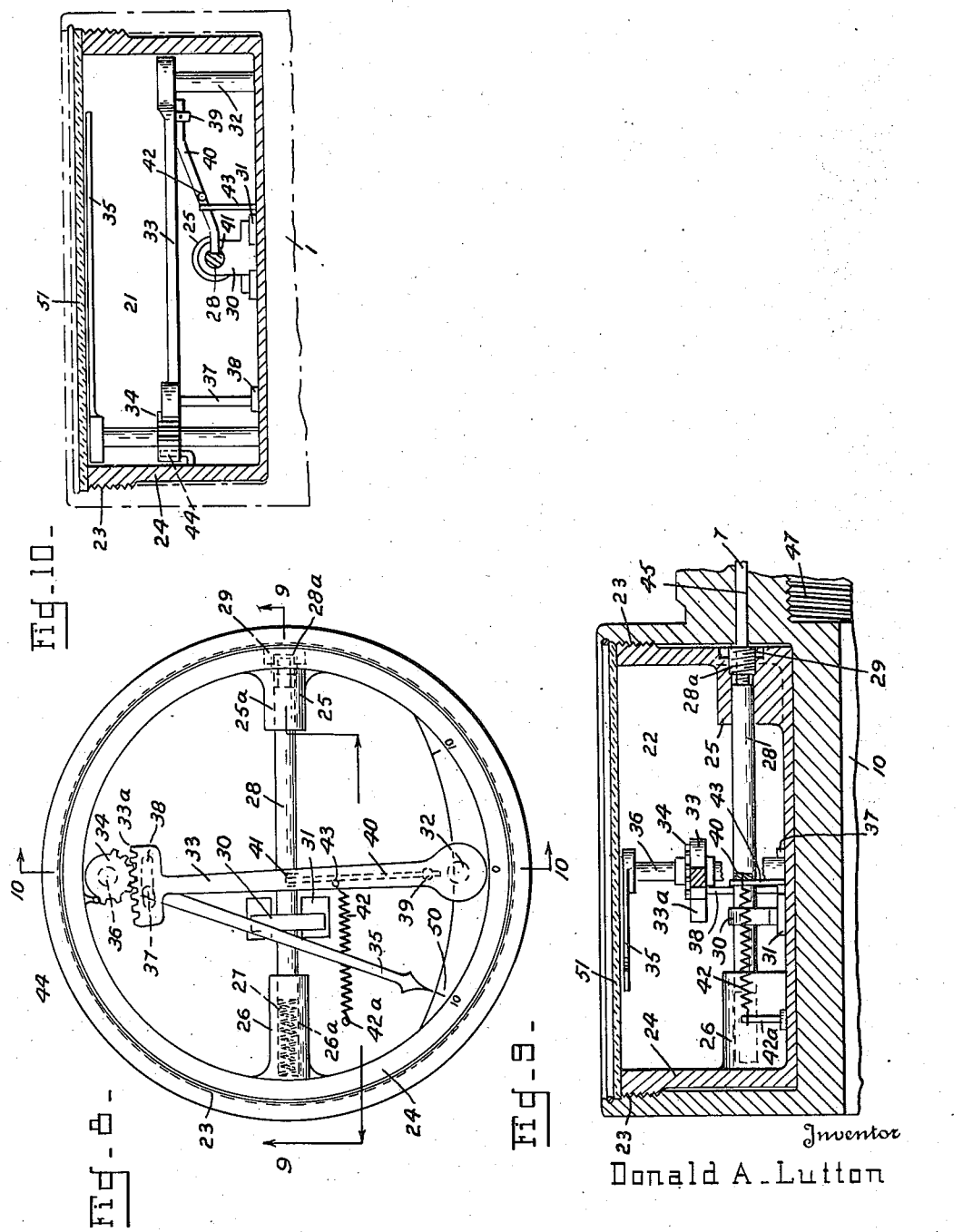

Patented Apr. 30, 1946

2,399,236

UNITED STATES PATENT OFFICE 2,399,236

MICROMETER

Donald A. Lutton, Winthrop, Mass.

Application February 12, 1944, Serial No. 522,083

1 Claim. (Cl. 33—147)

(Granted under the act of March 3, 1883, as amended April 30, 1928; 370 O. G. 757)

The invention described herein may be manufactured and used by or for the Government for governmental purposes without the payment to me of any royalty thereon.

This invention relates to an improved micrometer by means of which the "feel" that is exercised by a skilled mechanic in attaining the ultimate precision of measurement of which the instrument is capable, is made available to any novice operator by a mechanical device. Hence the inexperienced and unskilled operator may readily measure with the improved micrometer with the same precision as that obtained by the skilled mechanic.

When using a vernier micrometer, the ability to "feel" the pressure exerted by the spindle thru the work against the anvil is the determining factor in the ability of the operator to correctly measure to the ten-thousandth part of an inch. The spindle is set against the work so that the pressure is transmitted thru the work to the anvil, the setting being accomplished by turning the sleeve which is integral with the spindle and screw. The torque exerted on the sleeve by the fingers of the operator is transmitted thru the screw to the spindle, hence the compressive force exerted by the spindle is proportional to the torque applied to the sleeve. Therefore, the sensitiveness of the operator's fingers determines the ability of the operator to accurately adjust the torque so that the stress applied to, and the corresponding strain or yield developed in the instrument and in the piece being measured, will be uniform instead of varying between successive measurements.

Accordingly, it is an object of this invention to provide an improved micrometer which will enable the inexperienced operator to consistently obtain the same precision in measurements as are expected of a skilled operator.

A particular object of this invention is to provide an improved micrometer having a dial indication of the amount of pressure exerted on the piece to be measured.

The specific nature of the invention as well as other objects and advantages thereof will clearly appear from a description of a preferred embodiment as shown in the accompanying drawings in which:

Fig. 1 is a side elevational view of the complete micrometer with a portion of the barrel broken away.

Fig. 2 is a top elevational view of the micrometer.

Fig. 3 is a sectional view taken along the plane 3—3 of Fig. 2.

Figs. 4 thru 7 are sectional views taken along the planes 4—4, 5—5, 6—6, and 7—7 of Fig. 3 respectively.

Fig. 8 is an enlarged top elevational view of the dial indicator.

Figs. 9 and 10 are sectional views taken along the planes 9—9 and 10—10 respectively of Fig. 8.

In Fig. 1 is shown in assembled relation a micrometer embodying this invention. The micrometer consists of the usual frame 1, nut 2, spindle 3, and sleeve 4, and in addition the spring 5, collet 6, push-rod 7, and pin 8, and the dial indicator 22.

More specifically, the frame 1 is of the usual U-form with an anvil 46 formed on one arm and a hollow cylinder 9 formed on the other arm. The cylinder 9 carries the usual scale graduations 49 but in construction varies considerably from the usual micrometer. The interior of cylinder 9 is shaped to produce three internal adjacent sectors 10, 11, and 12 of different diameters. Threads 13 are provided in the end of section 12. A nut 2 is inserted into section 12 and is finished to a size that will allow it to turn and slide freely in this space. In the side of the nut 2 is inserted a pin 8 which, in assembly, fits into a longitudinal slot 16 in the wall of cylinder 9 thereby permitting limited longitudinal movement of the nut 2 within section 12. Nut 2 is provided with interior micrometer threads 15. A collet 6 is screwed into the threads 13 in the end of cylinder 9. A spring 5 is mounted between nut 2 and collet 6. In the back end of the nut 2 is a pin hole 17 into which fits one nub 18 of the spring 5. The other nub 19 fits into a pin hole 20 in the collet 6. The spring 5 is assembled under a combined compressive and torsional stress for a purpose to be described.

A spindle 3 is mounted within the cylinder 9, being supported in bearing relation by the section 10. Spindle 3 extends into section 12 of cylinder 9 and on this portion of the spindle, micrometer threads 47 are provided which cooperate with the threads of the nut 2. The extreme end of spindle 3 is secured in conventional fashion to the base of hollow sleeve or barrel 4 or can be integral therewith. Sleeve 4 surrounds cylinder 9 and vernier graduations 48 are provided on the forward rim of sleeve 4 to cooperate with graduations 49.

The end of the arm of the frame 1 on which the cylinder 9 is provided, is enlarged to form a cylindrical recess 21. A dial indicator 22 is inserted in recess 21 and secured therein as by threads 23.

The indicator 22 (Figs. 8–10) consists of a hollow cylindrical housing 24 provided with exterior threads 23 and having two inwardly projecting nubs 25 and 26. Holes 25a and 26a are bored diametrically thru nub 25 and into nub 26 respectively as indicated. A spring 27 fits loosely inside of the hole 26a in nub 26 and in assembly is held under compression by a plunger 28 which extends from within the hole 26a in nub 26 thru hole 25a in nub 25 into a counterbored portion 29 on the periphery of housing 24. That portion of plunger 28 extending into counterbore 29 is reduced in diameter and a cap 28a is screwed thereon. Cap 28a thus provides a convenient means for making limited adjustment of the length of plunger 28. Secured to plunger 28 is a yoke 30 which slides on pads 31 on the base of housing 24, thereby restraining the plunger from twisting.

A gear arm 33 is pivotally supported at one end on a pin 32. The free end of gear arm 33 is provided with gear teeth 33a which mesh with a spur gear 34 which is rigidly assembled with a pointer 35 on a stud 36. A scale 50 is arranged beneath pointer 35. On the underside of the gear arm 33 is provided a stud 37 which slides on a pad 38 on the base of housing 24. Also on the under side of the gear arm 33 is a stud 39 which is slotted and thereby holds a flat spring 40 which extends into a notch 41 in the plunger 28. A helical spring 42 having one end secured to a post 42a in the base of housing 24 pulls the flat spring 40 toward the left. Since the helical spring 27 thrusts the plunger 28 toward the right, positive contact between plunger 28 and flat spring 40 is maintained at all times. A pin 43 mounted in base of housing 24 acts as a stop to prevent the movement of the gear arm 33 beyond the position shown in Fig. 8 and a pin 44 acts as a stop to prevent the movement of the pointer 35 and spur gear 34 assembly beyond the position shown in Fig. 8.

A transparent cover 51 is suitably secured to the top of housing 24. Connecting section 12 of cylinder 9 and recess 21 is a hole 45, axially parallel to the cylinder 9. In this connecting hole 45 is located a rod 7 with one end abutting nut 2 and thus flush with the shoulder 14 between section 12 and section 11, and the other end extending into the counterbored recess 29 in housing 24 to contact plunger 28. The rod 7 is under compressive load between the opposing thrusts of the spring 5 transmitted thru the nut 2 and the spring 27 transmitted thru the plunger 28.

The anvil 46 is of course axially coincident with the cylinder 9. In service the piece to be measured is held in position between the anvil 46 and the spindle 3. The sleeve 4 is then turned, hence advancing spindle 3 by engagement of spindle threads 47 and the nut 2 until contact is made on the piece to be measured, by both spindle 3 and anvil 46. Any additional movement of the sleeve 4 after actual contact with the piece to be measured, by the spindle 3 and the anvil 46, results in withdrawal of the nut 2 from contact with the shoulder 14 and its movement along the thread 47 of the spindle 3 compressing spring 5. This permits the compressed spring 27 to push out the plunger 28 of dial indicator 22 and it in turn pushes the rod 7 to maintain contact with the sliding nut 2. It will be noted that the spring 5 removes backlash between nut 2 and spindle 3 by its compressive stress and further holds pin 8 against the wall of slot 16 due to being assembled under torsional stress.

The motion of the plunger 28 is transmitted thru the flat spring 40 to the gear arm 33 which in turn transmits it thru the spur gear 34 to the pointer 35. The pointer moves above scale 50 so that the extent of motion can be readily determined. The scale, preferably with a zero reading in the center and graduations on each side, would serve to indicate in an arbitrary manner, the amount that the sliding nut 2 has been withdrawn from the shoulder 14 which in turn would cause a proportional compression of the spring 5. Since in helical springs the deformation is a linear function of the stress, the deflection of pointer 35 is proportional to the stress exerted on the piece to be measured between anvil 46 and spindle 3. Hence, successive measurements with the identical stress or "feel" may be made by turning sleeve 4 until pointer 35 reaches the same reading. The precision with which this stress could be duplicated would be governed only by the accuracy and sensitivity of the dial indicator which would be uniform at all times, and not by the ability of the operator to quantitatively reproduce an exact stress each time, which involves the human variable.

The micrometer is set by placing a standard gage block between the anvil 46 and the spindle 3 and then turning the sleeve 4 to the corresponding setting. At this point, the indicator reading should be zero. The length of the plunger 28 is adjusted by cap 28a so that the pointer comes to the zero position when the indicated measurement corresponds to the thickness of the gage block used. After having been set in this manner, the sensitivity of the micrometer will be such that even an inexperienced operator will be able to duplicate readings with great precision.

I claim:

In a micrometer having a yoke shaped frame, a hollow cylindrical extension on the frame, a counterbore in the end of said extension, a cylindrical nut mounted in said counterbore for axial movement with respect thereto, a hollow plug engageable in the end of said counterbore thereby limiting the axial movement of said nut within said counterbore, means for preventing rotational movement of said nut relative to the frame extension, a compression spring mounted between said nut and said plug and having its ends respectively secured to said nut and said plug, said spring being preloaded to produce a combined axial and torsional bias between said nut and said plug, a barrel rotatably mounted on said frame extension, a spindle secured to said barrel and arranged to project thru said hollow frame extension and threadably engage said nut whereby rotation of said barrel advances said spindle relative to said nut, and indicating means on the frame responsive to axial movement of said nut member relative to the frame.

DONALD A. LUTTON.